US010031734B2

(12) United States Patent
Kim et al.

(10) Patent No.: US 10,031,734 B2
(45) Date of Patent: Jul. 24, 2018

(54) DEVICE AND METHOD FOR GENERATING APPLICATION PACKAGE

(71) Applicant: Samsung Electronics Co., Ltd., Gyeonggi-do (KR)

(72) Inventors: Bo-Gon Kim, Gyeonggi-do (KR); Seung-Yeon Choe, Gyeonggi-do (KR); Jae-Min Park, Seoul (KR); Jung-Min Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 136 days.

(21) Appl. No.: 14/685,170

(22) Filed: Apr. 13, 2015

(65) Prior Publication Data

US 2015/0293753 A1 Oct. 15, 2015

(30) Foreign Application Priority Data

Apr. 11, 2014 (KR) .................. 10-2014-0043823

(51) Int. Cl.
| G06F 9/44 | (2018.01) |
| G06F 8/41 | (2018.01) |
| G06F 8/52 | (2018.01) |
| G06F 8/61 | (2018.01) |
| H04L 29/08 | (2006.01) |

(52) U.S. Cl.
CPC ............... G06F 8/47 (2013.01); G06F 8/52 (2013.01); G06F 8/64 (2013.01); H04L 67/1095 (2013.01)

(58) Field of Classification Search
None
See application file for complete search history.

(56) References Cited

U.S. PATENT DOCUMENTS 6,263,421 B1 * 7/2001 Anderson ............... G06F 12/10
717/136
7,434,213 B1 10/2008 Prakash et al.
(Continued)

FOREIGN PATENT DOCUMENTS

| EP | 0 943 990 | 9/1999 |
| EP | 1 215 575 | 6/2002 |

(Continued)

OTHER PUBLICATIONS

Jhiqun Chen, "Java Card Technology for Smart CArds", Architecture and Programmer's Guide, Jun. 1, 2000, 6 pages.
(Continued)

*Primary Examiner* — Qamrun Nahar
(74) *Attorney, Agent, or Firm* — The Farrell Law Firm, P.C.

(57) ABSTRACT

A method of a server and an electronic device are provided. The method includes receiving a package generated with an intermediate representation from a first electronic device; receiving build environment information on at least one third electronic device from a second electronic device; and generating an application package to be executed in the at least one third electronic device, based on the package or the build environment information. The electronic device includes a build unit configured to generate a Central Processing Unit (CPU-independent) binary and build information for CPUs involved in two or more third electronic devices; a package generation unit configured to generate a CPU-independent application package using the generated CPU-independent binary and the generated build information; and a package registration unit configured to transmit the generated CPU-independent application package to a server.

14 Claims, 12 Drawing Sheets

(56) References Cited

U.S. PATENT DOCUMENTS

| | | | |
|---|---|---|---|
| 2004/0158823 A1 | 8/2004 | Saint-Hilaire et al. | |
| 2004/0230950 A1* | 11/2004 | Bedner | G06F 8/76 717/118 |
| 2004/0268109 A1* | 12/2004 | Rothman | G06F 9/4401 713/1 |
| 2006/0129972 A1* | 6/2006 | Tyburski | G06F 8/61 717/106 |
| 2007/0294679 A1 | 12/2007 | Bobrovsky et al. | |
| 2009/0158272 A1* | 6/2009 | El-Assir | G06F 8/61 717/177 |
| 2010/0299661 A1 | 11/2010 | Citron et al. | |

FOREIGN PATENT DOCUMENTS

| | | |
|---|---|---|
| KR | 1020080066402 | 7/2008 |
| WO | WO 2011/076972 | 6/2011 |

OTHER PUBLICATIONS

Tatsuo Nakajima et al., "System Support for Migratory Continuous Media Applications in Distributed Real-Time Environments", XP002289879, Apr. 12, 1999, 12 pages.
European Search Report dated Jul. 14, 2015 issued in counterpart application No. 15163048.0-1954, 11 pages.
Anonymous: "JDK Installation for Microsoft Windows", XP055348341, Sep. 27, 2013.
European Search Report dated Feb. 28, 2017 issued in counterpart application No. 15163048.0-1954, 16 pages.
European Search Report dated May 15, 2017 issued in counterpart application No. 15163048.0-1954, 10 pages.
Alan Donovan et al., "PNaCl: Portable Native Client Executables", XP-002698094, Online, Feb. 22, 2010, 6 pages.
European Search Report dated Aug. 8, 2017 issued in counterpart application No. 15163048.0-1954, 7 pages.

* cited by examiner

DEVICE AND METHOD FOR GENERATING APPLICATION PACKAGE

PRIORITY

This application claims priority under 35 U.S.C. § 119(a) to Korean Patent Application Serial No. 10-2014-0043823, filed on Apr. 11, 2014 in the Korean Intellectual Property Office, the entire content of which is incorporated herein by reference.

BACKGROUND

1. Field of the Invention

The present disclosure relates generally to a device and method for generating an application package, and more particularly, to a device and method in which an electronic device can generate a platform-independent application package and transfer it to a server so that the server can generate an application package to be executed in different platforms.

2. Description of the Related Art

With the development of electronic devices, users can install a variety of desired applications in the electronic devices to use them at anytime and anywhere without limitations of time and space. For example, an electronic devices can receive an application package from an external electronic device in a network and install the received application package therein. Accordingly, applications that can be used in an electronic devices are diversifying, and application developers for electronic devices are increasing in number, as are electronic device makers.

With the advancement of various electronic devices, customized application packages suitable for respective electronic device versions are released to correspond to several types of Central Processing Units (CPUs) when the electronic devices are launched. When software versions are upgraded after their release, electronic device makers prepare application packages that can be operated on the basis of the respective software versions and the CPUs and provide them through a server. However, in order to generate such various application packages, developers have to perform the same task every time the software versions are upgraded.

SUMMARY

The present invention has been made to provide at least the advantages described below.

Accordingly, an aspect of the present disclosure is to provide a device and method in which a developer can provide a CPU-independent application package to a server so that it is unnecessary to register the application package in the server again even though a series of electronic devices are newly added, thereby enhancing developer convenience.

Another aspect of the present disclosure is to provide a device and method in which a server can receive information on a CPU-independent application package from developers and makers and change only a binary code (e.g. a binary) included in the application package to easily regenerate an optimized application package even though a series of electronic devices are newly added, thereby enhancing software portability.

Another aspect of the present disclosure is to provide a device and method in which an electronic device can generate a platform-independent application package and transfer it to a server, so that the server can generate an application package to be executed in each platform.

In accordance with an aspect of the present disclosure, a method of a server is provided. The method includes receiving a package generated with an intermediate representation from a first electronic device; receiving build environment information on at least one third electronic device from a second electronic device; and generating an application package to be executed in the at least one third electronic device, based on at least one of the package and the build environment information.

In accordance with another aspect of the present disclosure, a method of an electronic device is provided. The method includes generating a CPU-independent binary and build information for CPUs involved in two or more third electronic devices; generating a CPU-independent application package, using the generated binary and the generated build information; and transmitting the generated CPU-independent application package to a server.

In accordance with another aspect of the present disclosure, a method of an electronic device is provided. The method includes receiving a converting unit for each platform version to be applied to a third electronic device; receiving information on the third electronic device, information on a CPU that is to be supported for each platform version list, information, and build information; storing a system for each platform version, a platform library, and a header file of the third electronic device; and transmitting a build environment information of the third electronic device to a server.

In accordance with another aspect of the present disclosure, a server is provided. The server includes a build environment configuration unit configured to receive a package generated with an intermediate representation from a first electronic device and receive build environment information on at least one third electronic device from a second electronic device, and a converting unit configured to generate an application package to be executed in the at least one third electronic device based on at least one of the package and the build environment information.

In accordance with another aspect of the present disclosure, an electronic device is provided. The electronic device includes a build unit configured to generate a CPU-independent binary and build information for CPUs involved in two or more third electronic devices; a package generation unit configured to generate a CPU-independent application package using the generated CPU-independent binary and the generated build information; and a package registration unit configured to transmit the generated CPU-independent application package to a server.

In accordance with another aspect of the present disclosure, an electronic device is provided. The electronic device includes a converting unit configured to receive a converting unit for each platform version to be applied to a third electronic device; a terminal information unit configured to receive information on the third electronic device, information on a CPU that is to be supported for each platform version, list information, and build information; a library storage unit configured to store a system for each platform version, a platform library, and a header file of the third electronic device; and a communication unit configured to transmit a build environment information of the third electronic device to a server.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
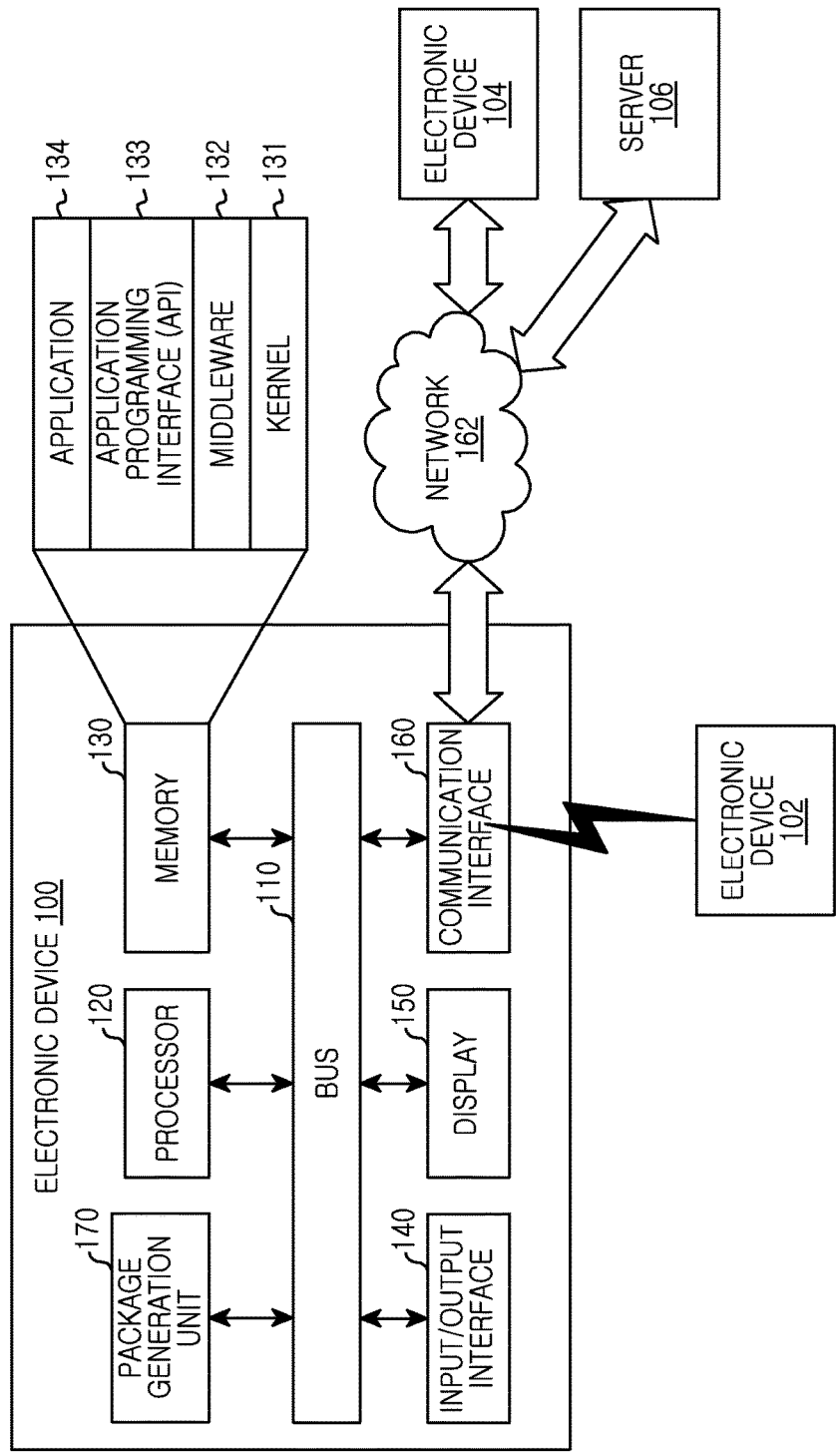
FIG. 1 is a block diagram of a network environment 100 including an electronic device 100 according to an embodiment of the present invention.

Hereinafter, embodiments of the present invention are described with reference to the accompanying drawings. The present invention may have various embodiments, and modifications and changes may be made therein. Therefore, the present invention will be described in conjunction with certain embodiments shown in the accompanying drawings. However, it should be understood that there is no intent to limit the present invention to the forms disclosed herein; rather, the present invention should be construed to cover all modifications, equivalents, and/or alternatives falling within the scope and spirit of the present invention. In the description of the accompanying drawings, identical or similar reference numerals are used to designate identical or similar elements.

As used herein, the expressions "include" and "may include" refer to the existence of a corresponding function, operation, or element, and do not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used herein, the expression "or" includes any or all combinations of words enumerated together. For example, the expression "A or B" may include A, B, or both A and B.

In the present disclosure, the expressions "a first," "a second," "the first," "the second," and the like may modify various elements, but the corresponding elements are not limited by these expressions. For example, the above expressions do not limit the sequence and/or importance of the corresponding elements. The above expressions may be used merely for the purpose of distinguishing one element from another element. For example, a first user device and a second user device indicate different user devices although both of them are user devices. For example, a first element may be referred to as a second element, and similarly, a second element may be referred to as a first element without departing from the scope of the present invention.

When an element is referred to as being "coupled" or "connected" to another element, it should be understood that not only the element may be directly coupled or connected to the other element, but also a third element may be interposed therebetween. In contrast, when a element is referred to as being "directly coupled" or "directly connected" to another element, it should be understood that no element is interposed therebetween.

The terms used herein are used only to describe certain embodiments of the present invention, but are not intended to limit the present invention. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to the present invention may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to an embodiment of the present invention, the electronic device may be a smart home appliance with a communication function. The smart home appliances may include at least one of, for example, televisions, Digital Video Disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to an embodiment of the present invention, the electronic device may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, an electronic equipment for ships (e.g., ship navigation equipment and a gyrocompass), avionics, security equipment, a vehicle head unit, an industrial or home robot, an Automatic Teller Machine (ATM) of a banking system, and a Point of Sale (POS) of a vendor.

According to an embodiment of the present invention, an electronic device may include at least one of a part of furniture or a building/structure having a communication function, an electronic board, an electronic signature receiving device, a projector, and various types of measuring instruments (e.g., a water meter, an electric meter, a gas meter, a radio wave meter, and the like). An electronic device according to the present invention may be a combination of one or more of the aforementioned various devices. Also, an electronic device according to the present invention may be a flexible device. However, an electronic device according to the present invention is not limited to the aforementioned devices.

Hereinafter, an electronic device according to various embodiments of the present invention are described with reference to the accompanying drawings. In the present disclosure, the term "user" may indicate a person using an electronic device or a device (e.g. an artificial intelligence electronic device) using an electronic device.

FIG. 1 is a block diagram of a network environment including an electronic device 100 according to an embodiment of the present invention.

Referring to FIG. 1, the electronic device 100 includes a bus 110, a processor 120, a memory 130, an input/output interface 140, a display 150, a communication interface 160, and a package generation unit 170.

The bus 110 is a circuit for interconnecting the aforementioned elements and transferring communication (e.g., a control message) between the aforementioned elements.

For example, the processor 120 may receive instructions from the aforementioned other elements (e.g., the memory 130, the input/output interface 140, the display 150, the communication interface 160, and the package generation unit 170) through the bus 110, decode the received instructions, and perform calculations or process data according to the decoded instructions.

The memory 130 stores instructions or data received from or generated by the processor 120 or the other elements (e.g., the input/output interface 140, the display 150, the communication interface 160, and the package generation unit 170). The memory 130 may include programming modules, for example, a kernel 131, middleware 132, an Application Programming Interface (API) 133, and at least one application 134. The aforementioned programming modules may be configured as software, firmware, hardware, or a combination of two or more thereof.

The kernel 131 controls or manages system resources (e.g., the bus 110, the processor 120, and the memory 130) that are used to execute operations or functions implemented in the remaining other programming modules, for example, the middleware 132, the API 133, and the application 134. In addition, the kernel 131 may provide an interface through which the middleware 132, the API 133, or the application 134 may access the individual elements of the electronic device 100 to control or manage the same.

The middleware 132 serves as a relay for enabling the API 133 or the application 134 to transfer data through a communication with the kernel 131. Furthermore, in regard to task requests received from the application 134, the middleware 132 may perform a control (e.g., scheduling or load balancing) for task requests, using a method such as allocating at least one of the application 134 a priority to use the system resources (e.g., the bus 110, the processor 120, and the memory 130) of the electronic device 100.

The API 133 is an interface through which the application 134 controls functions provided by the kernel 131 or the middleware 132 and includes at least one interface or function (e.g., an instruction) for file control, window control, image processing, or text control.

According to an embodiment of the present invention, the application 134 may include a Short Message Service (SMS)/Multimedia Message Service (MMS) application, an e-mail application, a calendar application, an alarm application, a health care application (e.g., an application for measuring an amount of exercise or a level of blood sugar), and an environmental information application (e.g., an application for providing information regarding atmospheric pressure, humidity, temperature, and the like). Additionally or alternatively, the application 134 may include an application related to an information exchange between the electronic device 100 and an external electronic device (e.g., an electronic device 104). The application related to the information exchange may include, for example, a notification relay application for transferring certain information to an external electronic device or a device management application for managing an external electronic device.

For example, the notification relay application may include a function of transferring, to an external electronic device (e.g., the electronic device 104), notification information generated from other applications of the electronic device 100 (e.g., an SMS/MMS application, an e-mail application, a health care application, an environmental information application, and the like). Additionally or alternatively, the notification relay application may receive notification information from, for example, an external electronic device (e.g., the electronic device 104) and provide the received notification information to a user. For example, the device management application may manage (e.g., install, delete, or update) functions for at least a part of an external electronic device (e.g., the electronic device 104) communicating with the electronic device 100 (e.g., turning on/off the external electronic device itself (or some elements thereof) or adjusting the brightness (or resolution) of a display), applications operating in an external electronic device, or services (e.g., a telephone call service or a message service) provided from an external electronic device.

According to the an embodiment of the present invention, the application 134 may include an application designated according to an attribute (e.g., a type) of an external electronic device (e.g., the electronic device 104). For example, in cases where an external electronic device is an MP3 player, the application 134 may include an application related to reproduction of music. Similarly, in cases where an external electronic device is a mobile medical device, the application 134 may include an application related to health care. According to an embodiment of the present invention, the application 134 may include at least one of an application designated to the electronic device 100 and an application received from an external electronic device (e.g., a server 106 or the electronic device 104).

The input/output interface 140 may transfer instructions or data, which is input from a user through an input/output device (e.g., a sensor, a keyboard, or a touch screen), to the processor 120, the memory 130, the communication interface 160, or the package generation unit 170 through the bus 110. For example, the input/output interface 140 may provide, to the processor 120, data for a user's touch input through the touch screen. In addition, through the input/output device (e.g., a speaker or a display), the input/output interface 140 may output instructions or data received from the processor 120, the memory 130, the communication interface 160, or the package generation unit 170 through the bus 110. For example, the input/output interface 140 may output voice data, processed through the processor 120, to a user through a speaker.

The display 150 displays various types of information (e.g., multimedia data or text data) to a user.

The communication interface 160 establishes communication between the electronic device 100 and an external electronic device (e.g., the electronic device 104 or the server 106). For example, the communication interface 160 may communicate with an external device while being connected to a network 162 through wireless or wired communication. The wireless communication may include at least one of, for example, Wireless Fidelity (Wi-Fi), Bluetooth (BT), Near Field Communication (NFC), Global Positioning System (GPS) and cellular communication (e.g., Long Term Evolution (LTE), LTE Advanced (LTE-A), Code Division Multiple Access (CDMA), Wideband CDMA (WCDMA), Universal Mobile Telecommunication System (UMTS), Wireless Broadband (WiBro), Global System for Mobile communication (GSM), or the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present invention, the network 162 may be a communication network. The communication network may include at least one of a computer network, the Internet, the Internet of Things (IoT), and a telephone network. According to an embodiment of the present invention, a protocol (e.g., a transport layer protocol, data link layer protocol, or a physical layer protocol) for communication between the electronic device 100 and an external device may be supported by at least one of the application 134, the application programming interface 133, the middleware 132, the kernel 131, and the communication interface 160.

The package generation unit 170 generates a CPU-independent application package, using generated binary and build information.

Figure 2:
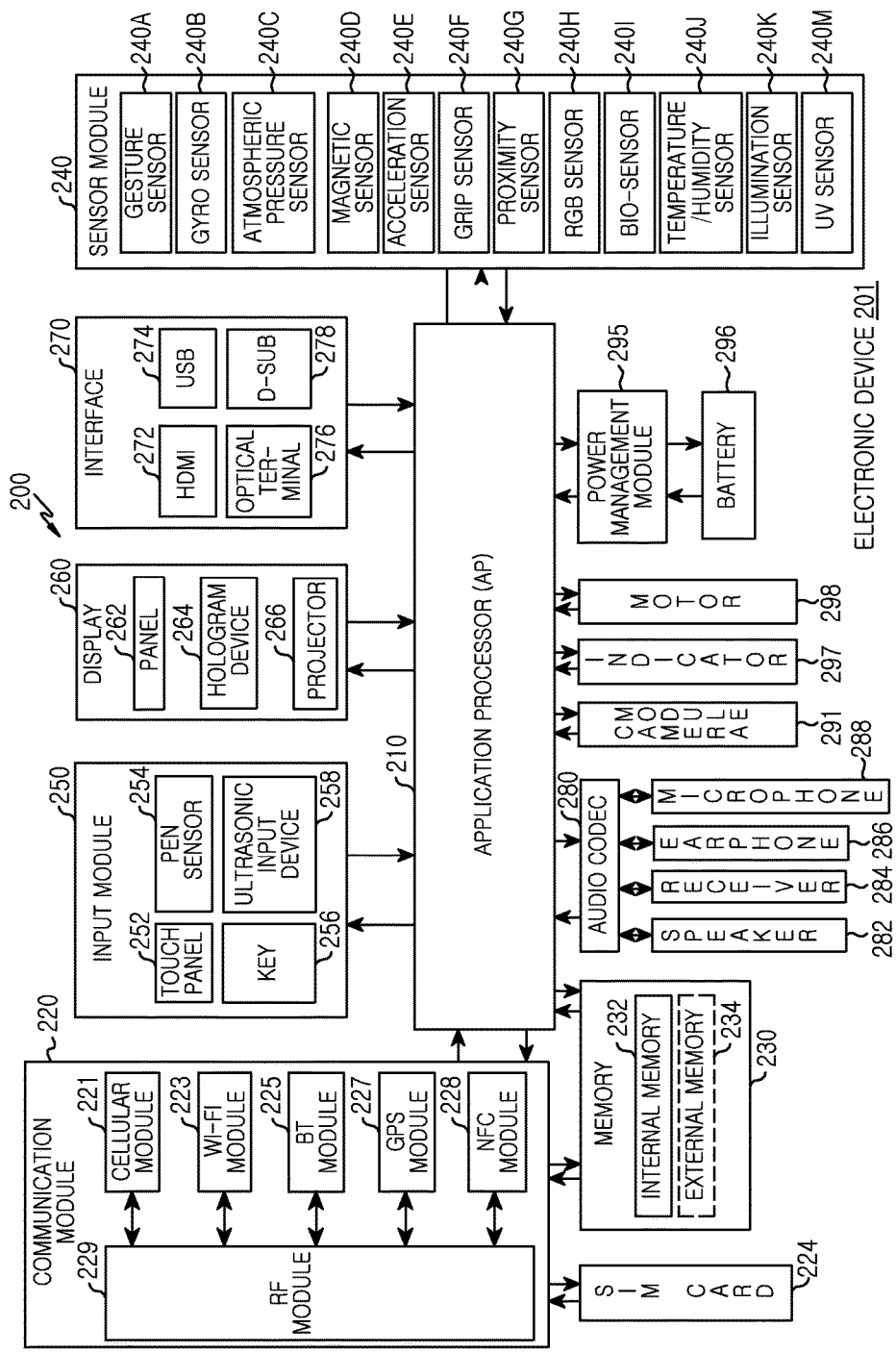
FIG. 2 is a block diagram of hardware according to an embodiment of the present invention.

FIG. 2 is a block diagram of hardware according to an embodiment of the present invention. An electronic device 201 may constitute, for example, the entirety or a part of the electronic device 100 illustrated in FIG. 1.

Referring to FIG. 2, the electronic device 201 includes at least one Application Processor (AP) 210, a communication module 220, a Subscriber Identification Module (SIM) card 224, a memory 230, a sensor module 240, an input module 250, a display 260, an interface 270, an audio compression/decompression (codec) module 280, a camera module 291, a power management module 295, a battery 296, an indicator 297, and a motor 298.

The AP 210 drives an operating system or application programs to control a plurality of hardware or software elements connected thereto and process data and perform calculations of various types on data including multimedia data. The AP 210 may be implemented as, for example, a System on Chip (SoC). According to an embodiment of the present invention, the AP 210 may further include a Graphics Processing Unit (GPU).

The communication module 220 (e.g., the communication interface 160) performs data transmission/reception in communication between the electronic device 201 (e.g., the electronic device 100) and other electronic devices (e.g., the electronic device 104 and the server 106) connected thereto through a network. According to an embodiment of the present invention, the communication module 220 may include a cellular module 221, a Wi-Fi module 223, a BT module 225, a GPS module 227, an NFC module 228, and a Radio Frequency (RF) module 229.

The cellular module 221 provides voice call, video call, Short Message Service (SMS), or an Internet service through a communication network (e.g., LTE, LTE-A, CDMA, WCDMA, UMTS, WiBro, or GSM). In addition, the cellular module 221 may distinguish between and authenticate electronic devices in a communication network using, for example, a SIM card 224. According to an embodiment of the present invention, the cellular module 221 may perform at least some functions that the AP 210 provides. For example, the cellular module 221 may perform at least some of the multimedia control functions.

According to an embodiment of the present invention, the cellular module 221 may include a Communication Processor (CP). In addition, the cellular module 221 may be implemented as, for example, an SoC. Although the elements such as the memory 230 and the power management module 295 are illustrated to be separate from the AP 210 in FIG. 2, the AP 210 may include at least some of the aforementioned elements (e.g., the cellular module 221) according to an embodiment.

According to an embodiment of the present invention, the AP 210 or the cellular module 221 (e.g., a communication processor) may load, in a volatile memory, instructions or data received from at least one of a non-volatile memory and other elements connected thereto and process the loaded instructions or data. In addition, the AP 210 or the cellular module 221 may store, in a non-volatile memory, data received from or generated by at least one of the other elements.

The Wi-Fi module 223, the BT module 225, the GPS module 227, or the NFC module 228 may include, for example, a processor that processes data transmitted/received through the corresponding module. Although the cellular module 221, the Wi-Fi module 223, the BT module 225, the GPS module 227, and the NFC module 228 are illustrated as separate blocks in FIG. 2, at least some (for example, two or more) of the cellular module 221, the Wi-Fi module 223, the BT module 225, the GPS module 227, and the NFC module 228 may be included in one Integrated Circuit (IC) or one IC package according to an embodiment of the present invention. For example, at least some (e.g., a communication processor corresponding to the cellular module 221 and a Wi-Fi processor corresponding to the Wi-Fi module 223) of the processors corresponding to the cellular module 221, the Wi-Fi module 223, the BT module 225, the GPS module 227, and the NFC module 228 may be implemented as one SoC.

The RF module 229 may transmit/receive data, for example, an RF signal. The RF module 229 may include, for example, a transceiver, a Power Amplifier Module (PAM), a frequency filter, a Low Noise Amplifier (LNA), or the like. In addition, the RF module 229 may further include a component, for example a conductor or a conductive wire, which transmits/receives electronic waves over a free air space in wireless communication. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to an embodiment of the present invention.

The SIM card 224 may be inserted into a slot formed at a certain position of the electronic device 201. The SIM card 224 includes unique identification information (e.g., an Integrated Circuit Card IDentifier (ICCID)) or subscriber information (e.g., an International Mobile Subscriber IDentity (IMSI)).

The memory 230 (e.g., the memory 130) may include an internal memory 232 or an external memory 234. The internal memory 232 may include, for example, at least one of a volatile memory (e.g., a Dynamic Random Access Memory (DRAM), a Static RAM (SRAM), and a Synchronous Dynamic RAM (SDRAM)), and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory).

According to an embodiment of the present invention, the internal memory 232 may be a Solid State Drive (SSD). The external memory 234 may further include a flash drive, for example, a Compact Flash (CF) drive, a Secure Digital (SD) card, a Micro Secure Digital (Micro-SD) card, a Mini Secure Digital (Mini-SD) card, an extreme Digital (xD) card, a memory stick, or the like. The external memory 234 may be functionally connected to the electronic device 201 through various interfaces. According to an embodiment of the present invention, the electronic device 201 may further include a storage device (or storage medium) such as a hard disc drive.

The sensor module 240 measures a physical quantity or detects an operating state of the electronic device 201 to convert the measured or detected information into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric sensor 240I, a temperature/humidity sensor 240J, an illumination sensor 240K, and a Ultra Violet (UV) light sensor 240M. Additionally or alternatively, the sensor module 240 may include, for example, an Electronic nose (E-nose) sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor, and the like. The sensor module 240 may further include a control circuit for controlling at least one sensor included therein.

The input device 250 may include a touch panel 252, a (digital) pen sensor 254, a key 256, or an ultrasonic input device 258. The touch panel 252 may recognize a touch input through at least one of, for example, a capacitive type, a pressure type, an infrared type, or an ultrasonic type. The touch panel 252 may further include a control circuit. In the case of a capacitive type touch panel, physical contact or proximity recognition is possible. The touch panel 252 may further include a tactile layer. In this case, the touch panel 252 may provide a tactile reaction to a user.

The (digital) pen sensor 254 may be implemented, for example, using the same or similar method to receiving a user's touch input, or using a separate recognition sheet. The key 256 may include, for example, a physical button, an optical key, or a keypad. The ultrasonic input device 258 may identify data by detecting an acoustic wave with a microphone (e.g., microphone 288) of the electronic device 201 through an input unit for generating an ultrasonic signal, and may perform wireless recognition. According to an embodiment of the present invention, the electronic device 201 may also receive a user input from an external device (e.g., a computer or a server) connected thereto, using the communication module 220.

The display 260 (e.g., the display 150) may include a panel 262, a hologram device 264, or a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured as one module together with the touch panel 252. The hologram 264 shows a three Dimensional (3D) image in the air using the interference of light. The projector 266 projects light onto a screen to display an image. The screen may be placed, for example, in the interior or on the exterior of the electronic device 201. According to an embodiment of the present invention, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) connector 278. The interface 270 may be included in, for example, the communication interface 160 illustrated in FIG. 1. Additionally or alternatively, the interface 270 in FIG. 2 may include, for example, a Mobile High-definition Link (MI-IL) interface, a Secure Digital (SD) card/Multi-Media Card (MMC) interface, or an Infrared Data Association (IrDA) standard interface.

The audio codec 280 may bilaterally convert a sound and an electrical signal. At least some elements of the audio codec 280 may be included in, for example, the input/output interface 140 illustrated in FIG. 1. The audio codec 280 may process sound information input or output through, for example, the speaker 282, the receiver 284, the earphone 286, the microphone 288 or the like.

The camera module 291 may capture still images or a moving images and, according to an embodiment of the present invention, may include one or more image sensors (e.g., a front sensor or a rear sensor), a lens, an Image Signal Processor (ISP), and a flash (e.g., a Light Emitting Diode (LED) or a xenon lamp).

The power management module 295 manages the power of the electronic device 201. The power management module 295 may include, for example, a Power Management Integrated Circuit (PMIC), a charger Integrated Circuit (IC), or a battery gauge.

The PMIC may be provided in, for example, an integrated circuit or an SoC semiconductor. Charging methods may be classified into a wired charging method and a wireless charging method. The charger IC may charge a battery and prevent the introduction of over-voltage or over-current from a charger. According to an embodiment, the charger IC may include a charger IC for at least one of the wired charging and the wireless charging. A magnetic resonance scheme, a magnetic induction scheme, or an electromagnetic scheme may be exemplified as the wireless charging method, and an additional circuit for wireless charging, such as a coil loop circuit, a resonance circuit, or a rectifier circuit, may be added.

The battery gauge measures, for example, a residual quantity of the battery 296, or a voltage, a current, or a temperature during charging. The battery 296 stores or generates electricity and supplies power to the electronic device 201 using the stored or generated electricity. The battery 296 may include, for example, a rechargeable battery or a solar battery.

The indicator 297 displays a particular status of the electronic device 201 or a part of the electronic device 201 (for example the AP 210), for example, a booting status, a message status, a charging status, and the like. The motor 298 converts an electric signal into a mechanical vibration. The electronic device 201 may include a processing unit (e.g., a GPU) for mobile TV support. The processing device for mobile TV support may process media data according to standards such as, a Digital Multimedia Broadcasting (DMB), a Digital Video Broadcasting (DVB), or a media flow.

Each of the components of the electronic device 201 according to the present invention may be implemented by one or more components and a name of a component may vary depending on the type of the electronic device 201. The electronic device 201 according to the present invention may be configured by including at least one of the above-described elements, and some of the elements may be omitted, or other elements may be added. Further, some of the elements of the electronic device 201 according to the present invention may be combined into one entity, which can perform the same functions as those of the components before the combination.

The term "module" used in the present disclosure may refer to, for example, a unit including one or more combinations of hardware, software, and firmware. The term "module" may be interchangeably used with "unit," "logic," "logical block," "component," or "circuit." The term "module" may refer to the smallest unit of an integrated component or a part thereof. The term "module" may refer to the smallest unit that performs one or more functions or a part thereof. The term "module" may refer to a module mechanically or electronically implemented. For example, the term "module" according to the present invention may refer to at least one of an Application-Specific Integrated Circuit (ASIC), a Field-Programmable Gate Array (FPGA), and a programmable-logic device for performing operations which are known or will be developed.

Figure 3:
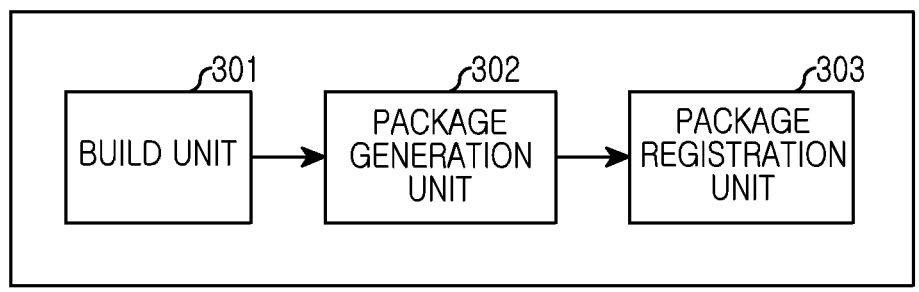
FIG. 3 is a block diagram of a first electronic device according to an embodiment of the present invention.

FIG. 3 is a block diagram of a first electronic device according to an embodiment of the present invention.

Referring to FIG. 3, the first electronic device invention includes a build unit 301, a package generation unit 302, and a package registration unit 303. In this case, the first electronic device is an electronic device that generates (or may generate) an application package. The first electronic device includes a device (e.g., a personal computer) that transfers, to a server, an application package generated by the first electronic device.

The build unit 301 includes a compiler, a linker, or a tool chain, and software or hardware (e.g., a CPU) for performing the function thereof. The compiler is a translation program for converting a program written in a high-level language to an object code program that is equivalent thereto and can be executed in an electronic device. The linker is a program for integrating two or more object code programs into one executable program. The tool chain is a set of tools for building source code and converting it to a target code.

According to an embodiment of the present invention, the build unit 301 generates a package with an intermediate representation. The package of the intermediate representation includes, for example, a binary package that is not dependent on a CPU of an electronic device.

The build unit 301 generates a CPU-independent binary package (e.g. a binary) using the tool chain. For example, the CPU-independent binary package is generated with an architecture-independent intermediate representation through the tool chain. In addition, using the tool chain, the build unit 301 integrates generated binaries into one file, or makes generated binaries into a plurality of files according to a type of project and then merges them into a bundle.

Furthermore, the build unit 301 generates a second build information file. For example, second build information is used to change a binary in the server. The second build information is generated depending on a build option of the first electronic device or is generated only with the default build option irrespective of the build option of the first electronic device. The second build information file may also be generated in the package generation unit 302. When build information of a plurality of binaries are different from each other, the build unit 301 generates build information for each binary file or generates one piece of build information for one binary.

The package generation unit 302 generates a CPU-independent application package that includes a CPU-independent binary and the second build information file which are generated in the build unit 301.

The package registration unit 303 registers, in a server, the CPU-independent application package generated in the package generation unit 302. The package registration unit 303 may receive, from a server, reporting information as to whether a group of added terminals is suitable for a change. The package registration unit 303 may receive binary and debugging information from a server.

Figure 4:
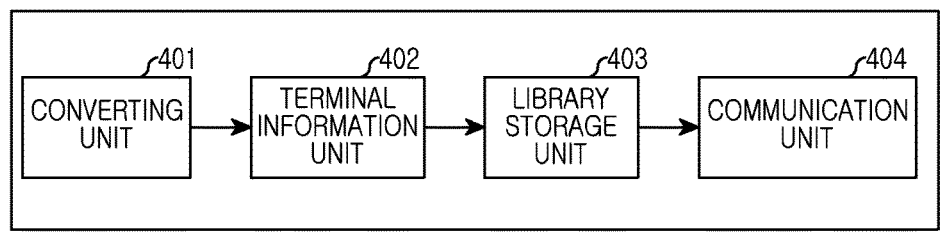
FIG. 4 is a block diagram of a second electronic device according to an embodiment of the present invention.

FIG. 4 is a block diagram of a second electronic device according to an embodiment of the present invention.

Referring to FIG. 4, the second electronic device transmits build environment information, and the second electronic device includes a converting unit 401, a terminal information unit 402, a library storage unit 403, and a communication unit 404. The second electronic device may be an electronic device corresponding to a maker that manufactures a third electronic device. That is, the electronic device is referred to as the second electronic device in this embodiment of the present invention. However, irrespective of the name, the electronic device may be any device through which a maker can transmit build environment information to a server.

The converting unit 401 includes a converter (e.g. a tool chain) for each platform version that will be applied to the third electronic device. According to an embodiment of the present invention, the converting unit 401 receives at least one instruction for adding, deleting, and changing the build information transmitted to a server. According to an embodiment of the present invention, in addition to the converting unit 401, all the elements of the second electronic device (e.g. the converting unit 401, the terminal information unit 402, the library storage unit 403, and the communication unit 404) may receive at least one instruction for adding, deleting, and changing the build information transmitted to a server.

The terminal information unit 402 includes information on the third electronic device, information on a CPU that can be supported for each platform version, list information of the third electronic device, and the first build information. The first build information includes CPU-dependent build information such as a build option, floating-point calculation information, Application Binary Interface (ABI) information, and the like.

The library storage unit 403 stores a system for each platform version of the third electronic device, a platform library, and a header file.

The communication unit 404 transmits the build environment information to a server. In addition, the communication unit 404 transmits, to a server, the instruction input for adding, deleting, and changing the build environment information transmitted to the server.

Figure 5:
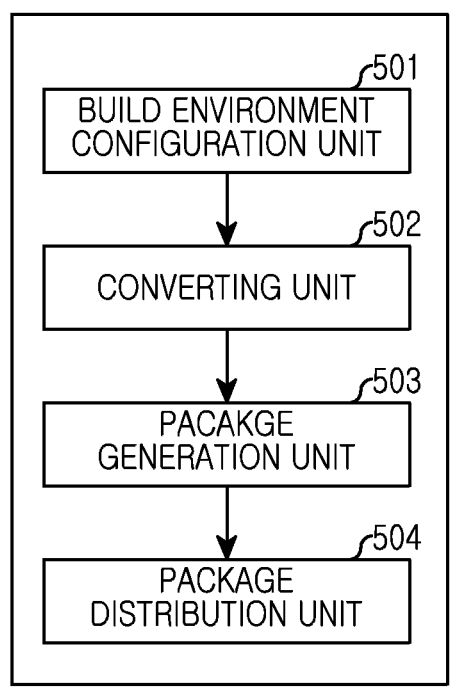
FIG. 5 is a block diagram of a server according to an embodiment of the present invention.

FIG. 5 is a block diagram of a server according to an embodiment of the present invention.

Referring to FIG. 5, the server includes a build environment configuration unit 501, a converting unit 502, a package generation unit 503, and a package distribution unit 504. For example, a description is provided below based on an assumption that a first electronic device is an electronic device that generates a package (e.g., an application developer's electronic device), a second electronic device is an electronic device that provides information on a third electronic device (e.g., an electronic device corresponding to a manufacturing company), and the third electronic device is an electronic device that downloads an application package (e.g., a user's electronic device).

The build environment configuration unit 501 receives, from the first electronic device, a CPU-independent application package for the CPUs included in a plurality of third electronic devices and receives, from the second electronic device, build environment information on the third electronic devices. In this case, the build environment configuration unit 501 receives the application package and the build environment information from the first and second electronic devices, respectively, simultaneously or irrespective of the sequence thereof.

The converting unit 502 changes a binary included in the package, using the received application package and build environment information. In this case, the CPU-independent application package includes a CPU-independent binary and the build information of the third electronic devices. The binary changed by the converting unit 502 may be optimized for the processing speeds of the respective CPUs.

The package generation unit 503 generates an application package including the changed binary. The build environment configuration unit 501, the converting unit 502, or the package generation unit 503 simulates the regenerated package and feeds back the simulation result to the first electronic device.

The package distribution unit 504 receives a request for an application package from at least one of the third electronic devices, searches for a package including a binary that is optimized for the third electronic device having requested the application package, and transmits, to the third electronic device, the package obtained by the search.

Figure 6:
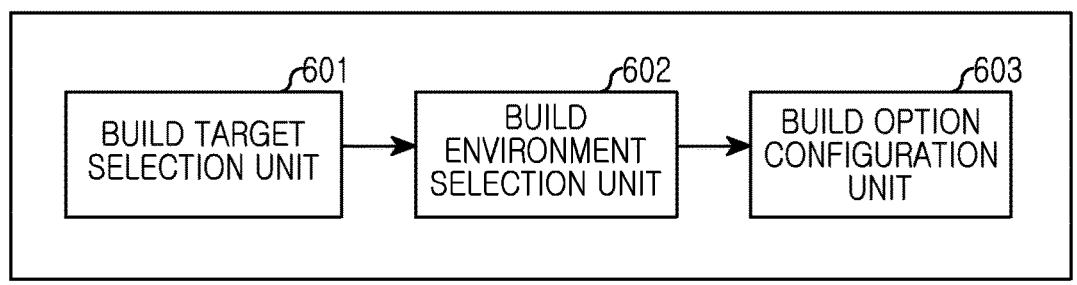
FIG. 6 is a block diagram of a build environment configuration unit included in a server according to an embodiment of the present invention.

FIG. 6 is a block diagram of the build environment configuration unit included in a server according to an embodiment of the present invention.

Referring to FIG. 6, the build environment configuration unit includes a build target selection unit 601, a build environment selection unit 602, and a build option configuration unit 603.

The build target selection unit 601 selects a build target to change a binary included in a package, by comparing build information of an electronic device to download an application included in the package (e.g., the second build information file transmitted by the first electronic device) to information on the electronic device to download the application (e.g., the information on the third electronic device transmitted by the second electronic device).

The build environment selection unit 602 selects a converter (e.g., a converter transmitted by the first electronic device) and a library storage area (e.g., a library transmitted by the second electronic device), which are suitable for the build target.

The build option configuration unit 603 configures a build option using build option information included in the package (e.g., build option information in the package transmitted by the first electronic device), build option information included in build environment information (e.g., build option in the first build information in the terminal information in the build environment information transmitted by the second electronic device), and build option information included in the selected converter. In this manner, the build option configuration unit 603 configures a build option optimized for a CPU.

According to an embodiment of the present invention, a server includes a build environment configuration unit that receives a package generated with an intermediate representation from a first electronic device and receives build environment information on at least one third electronic device from a second electronic device, and a converting unit that generates an application package to be executed in the third electronic device, based on the package or the build environment information.

The package generated with the intermediate representation may be configured of a CPU-independent binary of the third electronic device and build information of the third electronic device.

The build environment configuration unit includes a build target selection unit 601 that selects a build target to change a binary involved in the package, by comparing build information of the third electronic device involved in the package with the build environment information on the third electronic device; a build environment selection unit 602 that selects a converting unit and a platform library storage unit corresponding to the selected build target from the build information; and a build option configuration unit 603 that configures a build option using build option information involved in the package, build option information involved in the build environment information, and build option information involved in the selected converting unit.

The converting unit changes a binary involved in the package, using the received application package and the build environment information.

The server may further include a package generation unit that regenerates an application package including the changed binary, wherein the build environment configuration unit may simulate the regenerated package and feed back the simulation result to the first electronic device.

The server may further include a package generation unit that regenerates an application package including a changed binary, and a package distribution unit that receives a request for an application package from the at least one third electronic device, searches for the regenerated package, and transmits, to the third electronic device, the regenerated package obtained by the search.

According to an embodiment of the present invention, an electronic device includes a build unit that generates a CPU-independent binary and build information for CPUs involved in two or more third electronic devices; a package generation unit that generates a CPU-independent application package, using the generated binary and build information; and a package registration unit that transmits the generated application package to a server.

The CPU-independent binary may be generated with architecture-independent intermediate representation through a converting unit.

According to an embodiment of the present invention, an electronic device includes a converting unit that receives a converting unit for each platform version to be applied to a third electronic device; a terminal information unit that receives information on the third electronic device, information on a CPU that is to be supported for each platform version, list information, and build information; a library storage unit that stores a system for each platform version of the third electronic device, a platform library, and a header file; and a communication unit that transmits the received build environment information of the third electronic device to a server.

The converting unit receives at least one instruction for adding, deleting, and changing at least a portion of the build environment information transmitted to the server, and the communication unit transmits the received instruction to the server.

Figure 7:
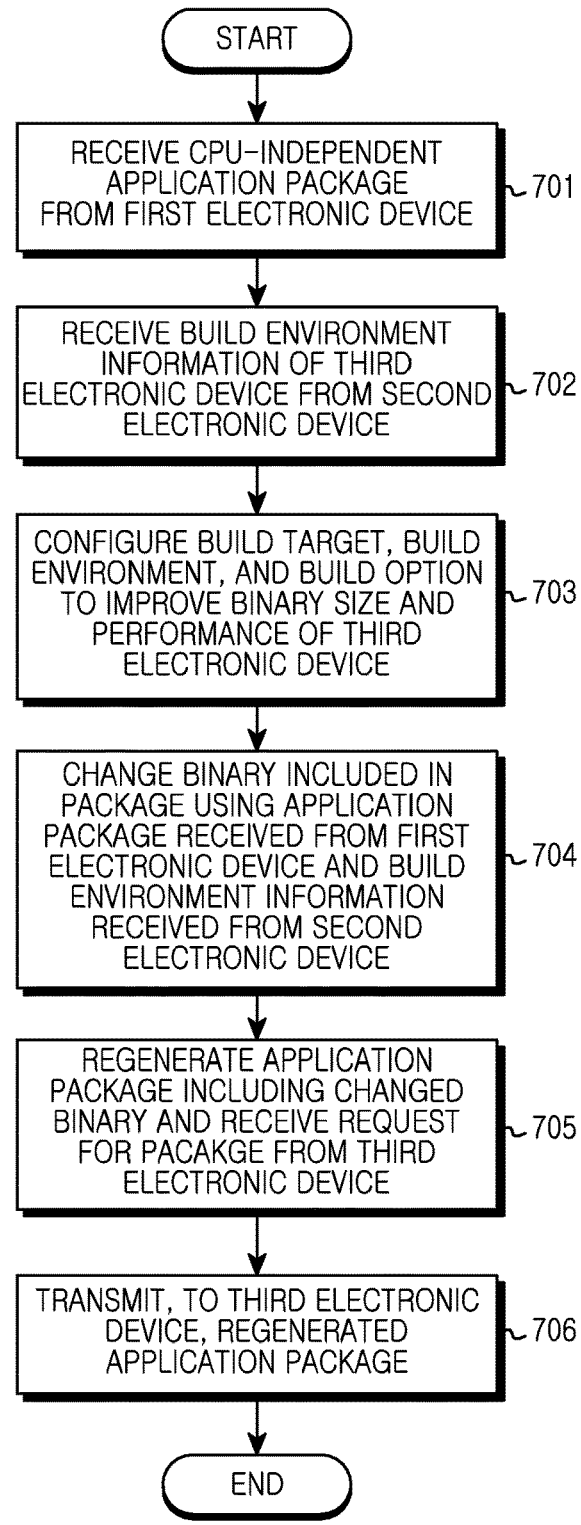
FIG. 7 is a flowchart of a method of a server according to an embodiment of the present invention.

FIG. 7 is a flowchart of a method of a server according to an embodiment of the present invention. In this case, a first electronic device is an electronic device that generates a CPU-independent application package. A second electronic device is an electronic device that provides information (e.g., build information) on a third electronic device, and the third electronic device is an electronic device that downloads an application.

In step 701, the server receives a CPU-independent application package from the first electronic device. In this case, the CPU-independent binary package may be generated with an architecture-independent intermediate representation through a tool chain. In addition, the CPU-independent application package may include a CPU-independent binary and second build information. The second build information may be option information added by a developer, or may be configured of only the default build option when there is no option information of the developer.

In step 702, the server receives build environment information of the third electronic device from the second electronic device. In this case, the build environment information may include information on a converter (e.g. a tool chain), information on a software development kit, information on the third electronic device, and library information. Alternatively, steps 701 and 702 may be simultaneously performed, or step 702 may precede step 701. That is, the server is not constrained by the sequence of steps 701 and 702.

In step 703, the server configures a build option to optimize the binary size and performance of the third electronic device.

In step 704, the server changes a binary included in the package, using the application package received from the first electronic device and the build environment information received from the second electronic device. According to an embodiment of the present invention, the server changes a binary included in the application package, using the CPU-independent application package received from the first electronic device and the build environment information for each terminal received from the second electronic device. In this case, terminal information in the build environment information includes information on a CPU that can be supported for each platform, a list of third electronic devices, and the first build information. The first build information may include CPU-dependent build information such as floating-point calculation information, ABI information, build option information, and the like.

In step 705, the server regenerates an application package including the changed binaries. That is, for a newly added application, the server changes only the binary included in the application package and then generates a CPU-optimized application package including the changed binary. According to an embodiment of the present invention, the server receives a request for an application package from the third electronic device.

In step 706, the server transmits, to the third electronic device, the regenerated application package. According to an embodiment of the present invention, the server searches for an application package optimized for the third electronic device having requested the application package and then transmits, to the third electronic device, the searched application package.

Figure 8:
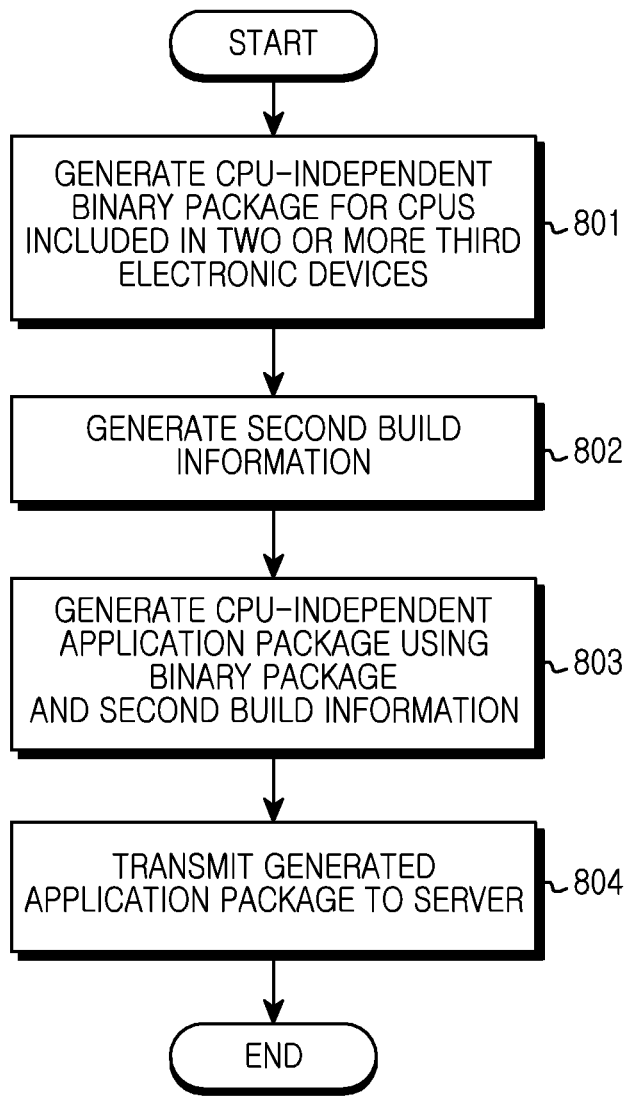
FIG. 8 is a flowchart of a method of a first electronic device according to an embodiment of the present invention.

FIG. 8 is a flowchart of a method of a first electronic device according to an embodiment of the present invention. In this case, the first electronic device is an electronic device that generates a CPU-independent application package. A third electronic device is an electronic device that downloads an application.

In step 801, the first electronic device generates a CPU-independent binary package for the CPUs included in two or more third electronic devices. In this case, the CPU-independent binary package may be generated with an architecture-independent intermediate representation through a tool chain.

In step 802, the first electronic device generates second build information. In this case, the second build information may be option information added by a developer or option information configured of only the default build option.

In step 803, the first electronic device generates a CPU-independent application package, using the CPU-independent binary package and the second build information. According to an embodiment of the present invention, the first electronic device generates a CPU-independent application package using the CPU-independent binary package which is configured of an architecture-independent intermediate representation through a tool chain and the option information added by the developer.

In step 804, the first electronic device transmits the generated application package to a server. According to an embodiment of the present invention, the first electronic device registers the generated CPU-independent application package in the server.

Figure 9:
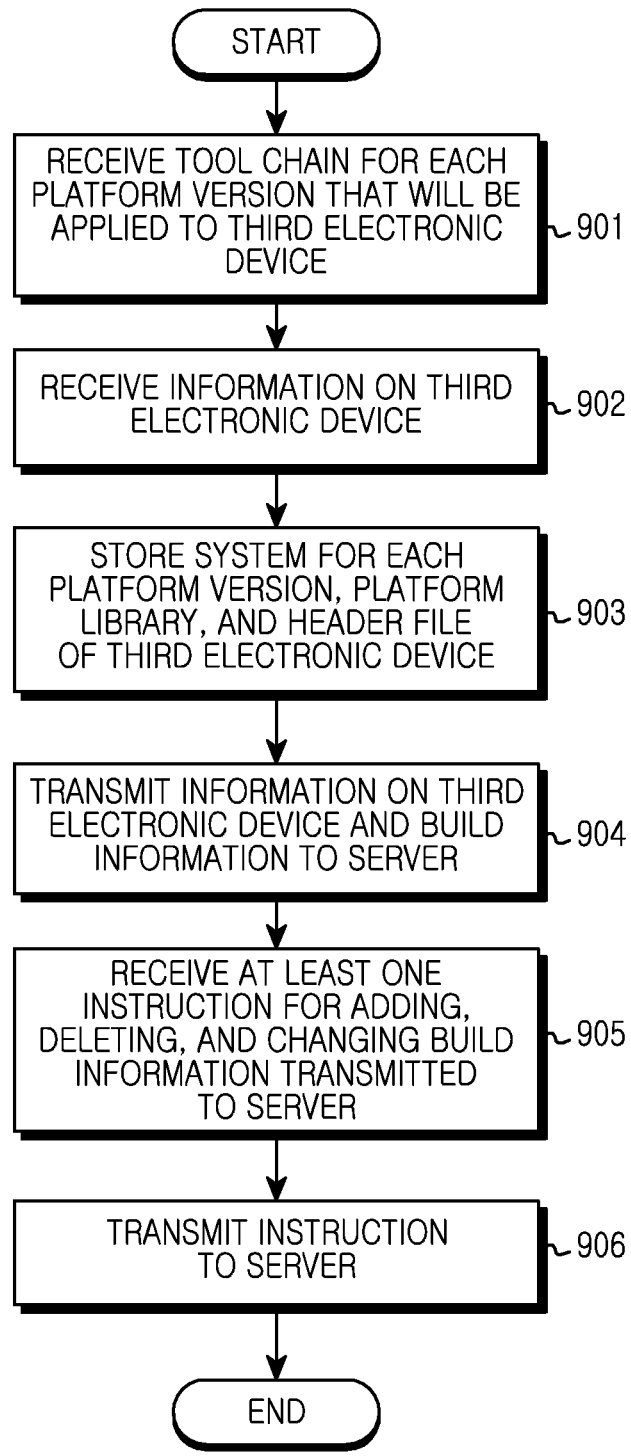
FIG. 9 is a flowchart of a method of a second electronic device according to an embodiment of the present invention.

FIG. 9 is a flowchart of a method of a second electronic device according to an embodiment of the present invention. In this case, the second electronic device is an electronic device that provides information (e.g., build information) on a third electronic device, and the third electronic device is an electronic device that downloads an application.

In step 901, the second electronic device receives a converter (e.g. a tool chain) for each platform version that will be applied to the third electronic device.

In step 902, the second electronic device receives terminal information (e.g., information on a CPU that can be supported for each platform, a list of third electronic devices, and the first build information). In this case, the first build information includes CPU-dependent build information such as a build option, floating-point calculation information, ABI information, and the like.

In step 903, the second electronic device stores a system for each platform version, a platform library, and a header file of the third electronic device.

Steps 901 to 903 may be performed irrespective of the sequence thereof.

In step 904, the second electronic device transmits the build environment information (e.g., the converter, the terminal information, the library, and the like) to a server.

In step 905, the second electronic device receives at least one instruction for adding, deleting, and changing the build environment information transmitted to the server. That is, the second electronic device receives an instruction for adding, deleting, and changing build environment information which a manufacturing company has transmitted to the server.

In step 906, the second electronic device transmits the instruction to the server. That is, after receiving the instruction for adding, deleting, and changing the build environment information transmitted to the server, the second electronic device adds, deletes, and changes the build environment information transmitted to the server.

Figure 10:
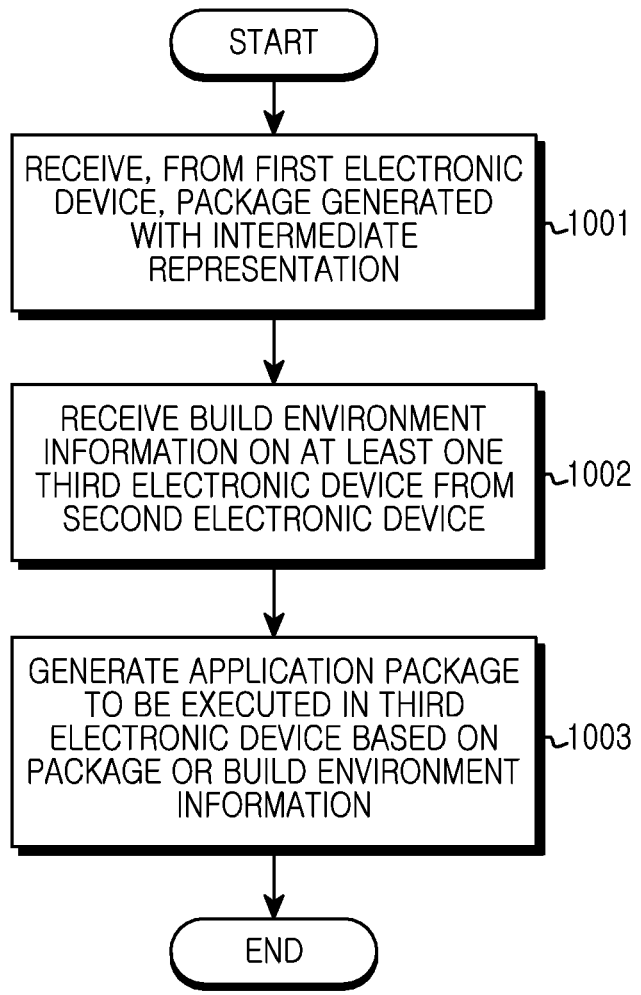
FIG. 10 is a flowchart of a method of a server according to an embodiments of the present invention.

FIG. 10 is a flowchart of a method of a server according to an embodiment of the present invention. Hereinafter, a description is provided based on an assumption that a first electronic device is an electronic device that generates a package (e.g., an application developer's electronic device), a second electronic device is an electronic device that provides information on a third electronic device (e.g., an electronic device corresponding to a manufacturing company), and the third electronic device is an electronic device that downloads an application package (e.g., a user's electronic device).

In step 1001, the server receives, from the first electronic device, a package that is generated with an intermediate representation. According to an embodiment of the present invention, the first electronic device is an electronic device that generates a CPU-independent application package. According to an embodiment of the present invention, the CPU-independent binary package is generated with an architecture-independent intermediate representation through a tool chain. According to an embodiment of the present invention, the CPU-independent application package includes a CPU-independent binary package and the second build information. According to an embodiment of the present invention, the build environment information includes information on a converter (e.g. a tool chain), information on a software development kit, information on the third electronic device, and library information.

In step 1002, the server receives build environment information on at least one third electronic device from the second electronic device. According to an embodiment of the present invention, the server configures a build option to optimize the binary size and performance of the third electronic device.

In step 1003, the server generates an application package to be executed in the third electronic device based on the package or the build environment information. According to an embodiment of the present invention, the server changes a binary included in the package, using the received application package and builds environment information. According to an embodiment of the present invention, the server changes the binary included in the package, using the application package received from the first electronic device and the build environment information received from the second electronic device. According to an embodiment of the present invention, the server changes the binary included in the application package, using the CPU-independent application package received from the first electronic device and the build environment information for each terminal received from the second electronic device.

Figure 11:
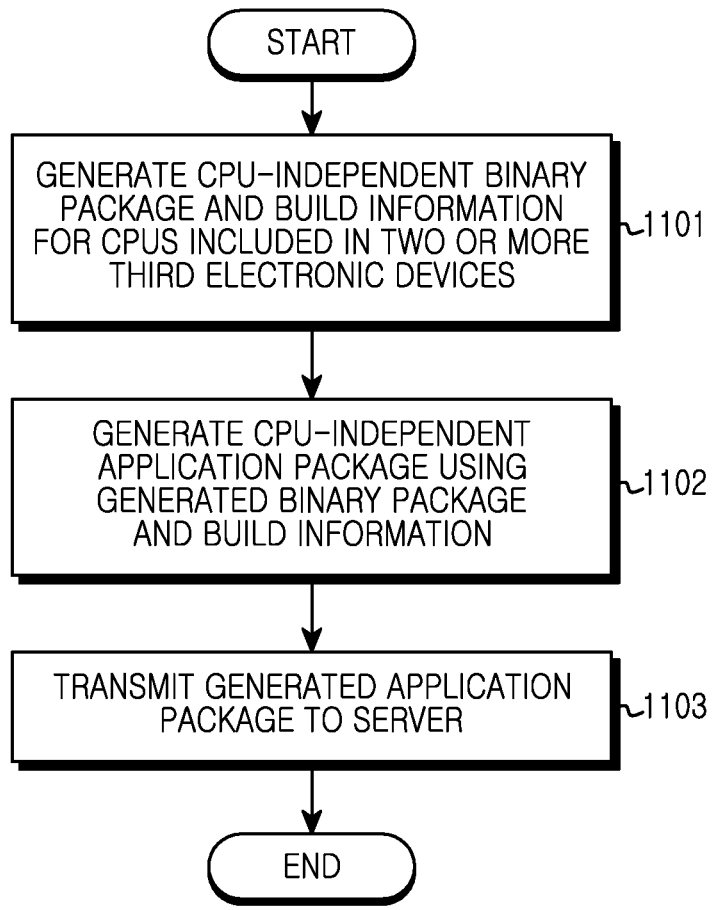
FIG. 11 is a flowchart of a method of a first electronic device according to an embodiment of the present invention.

FIG. 11 is a flowchart of a method of a first electronic device according to an embodiment of the present invention.

Referring to FIG. 11, in step 1101, the first electronic device generates a CPU-independent binary package and builds information for the CPUs included in two or more third electronic devices. According to an embodiment of the present invention, the CPU-independent binary package is generated with an architecture-independent intermediate representation through a tool chain.

In step 1102, the first electronic device generates a CPU-independent application package using the binary package and the build information. According to an embodiment of the present invention, the first electronic device generates the CPU-independent application package using a CPU-independent binary package, which is configured of an architecture-independent intermediate representation through a tool chain, and option information added by a developer.

In step 1103, the first electronic device transmits the generated application package to a server. According to an embodiment of the present invention, the first electronic device registers the generated CPU-independent application package in the server.

Figure 12:
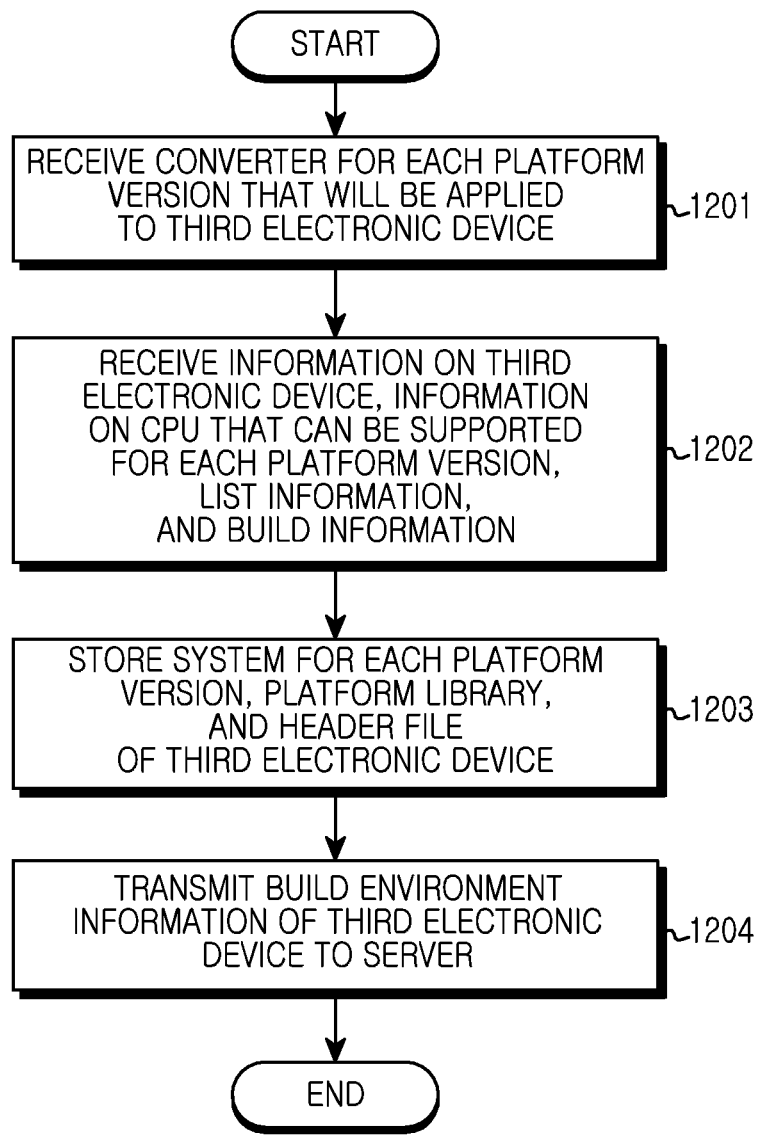
FIG. 12 is a flowchart of a method of a second electronic device according to an embodiments of the present invention.

FIG. 12 is a flowchart of a method of a second electronic device according to an embodiment of the present invention. According to an embodiment of the present invention, the second electronic device is an electronic device that provides information (e.g., build information) on a third electronic device, and the third electronic device is an electronic device that downloads an application.

In step 1201, the second electronic device receives a converter (e.g. a tool chain) for each platform version that will be applied to the third electronic device.

In step 1202, the second electronic device receives terminal information (e.g., information on a CPU that can be supported for each platform, a list of third electronic devices, and the first build information). According to an embodiment of the present invention, the first build information includes CPU-dependent build information such as a build option, floating-point calculation information, ABI information, and the like.

In step 1203, the second electronic device stores a system for each platform version, a platform library, and a header file of the third electronic device. Steps 1201 to 1203 may be performed irrespective of the sequence thereof.

In step 1204, the second electronic device transmits the build environment information (e.g., the converter, the terminal information, the library, and the like) to a server.

According to an embodiment of the present invention, a method of a server includes receiving, by the server, a package generated with an intermediate representation from a first electronic device; receiving, by the server, build environment information on at least one third electronic device from a second electronic device; and generating, by the server, an application package to be executed in the third electronic device, based on the package or the build environment information.

The package generated with the intermediate representation is configured of a CPU-independent binary of the third electronic device and build information of the third electronic device.

The method may further include selecting a build target to change a binary involved in the package, by comparing build information of the third electronic device involved in the package to the build environment information on the third electronic device; selecting a converting unit and a platform library storage unit corresponding to the selected build target from the build information; and configuring a build option using build option information involved in the package, build option information involved in the build environment information, and build option information involved in the selected converting unit.

Generating the application package includes changing a binary involved in the package, using the received application package and the build environment information.

The method may further include regenerating an application package including the changed binary; simulating the regenerated package; and feeding back the simulation result to the first electronic device.

The method may further include regenerating an application package including a changed binary; receiving a request for an application package from the at least one third electronic device; and searching for the regenerated package and transmitting, to the third electronic device, the regenerated package obtained by the search.

According to an embodiment of the present invention, an operating method of an electronic device includes generating a CPU-independent binary and build information for CPUs involved in two or more third electronic devices; generating a CPU-independent application package using the generated binary and build information; and transmitting the generated application package to a server.

The CPU-independent binary is generated with architecture-independent intermediate representation through a converting unit.

According to an embodiment of the present invention, a method of an electronic device includes receiving a converting unit for each platform version to be applied to a third electronic device; receiving information on the third electronic device, information on a CPU that is to be supported for each platform version, list information, and build information; storing a system for each platform version of the third electronic device, a platform library, and a header file; and transmitting the received build environment information of the third electronic device to a server.

The method may further include receiving at least one instruction for adding, deleting, and changing at least a portion of the build environment information transmitted to the server, and transmitting the received instruction to the server.

Although certain embodiments have been disclosed and illustrated in the specification and drawings, they are merely presented to easily describe the technical contents of the present disclosure and help in the understanding of the present invention and are not intended to limit the scope of the present invention. Therefore, all changes or modifications derived from the technical idea of the present invention as well as the embodiments described herein should be interpreted to belong to the scope of the present invention, as defined by the appended claims, and their equivalents.

What is claimed is:

1. A method of a server, comprising:
receiving, from a first electronic device, an application package including a Central Processing Unit (CPU)-independent binary and build information including build option information associated with development of a CPU-independent package, the application package being associated with an application to be executed by at least one third electronic device;
receiving, from a second electronic device different from the first electronic device, build environment information about the at least one third electronic device, wherein the build environment information comprises information on the at least one third electronic device supportable by each platform version, information on a converter for the each platform version to be applied to the at least one third electronic device, and information on a CPU-dependent build option;
by combining the build information with the build environment information, selecting, among the at least one third electronic device, a build target for which the CPU-independent binary is changed;
selecting a converter corresponding to the build target;
configuring a build option corresponding to the build target using the build option information included in the build information and the CPU-dependent build option included in the build environment information and a build option information associated with the selected converter; and
changing the CPU-independent binary, using the configured build option corresponding to the selected build target, so that the changed binary is optimized for processing speed of a CPU of the build target,
wherein the second electronic device comprises an electronic device corresponding to a maker that manufactures the at least one third electronic device.

2. The method of claim 1, wherein the application package is also generated with an intermediate representation by the first electronic device using the build information of the at least one third electronic device.

3. The method of claim 1, further comprising:
regenerating the application package by including the changed binary;
simulating the regenerated application package in the server; and
feeding back a simulation result to the first electronic device.

4. The method of claim 1, further comprising:
receiving a request for an application package from a fourth electronic device among the at least one third electronic device;
searching for a regenerated application package including a binary that is optimized for a processing speed of a CPU of the forth electronic device; and
transmitting, to the fourth electronic device, the regenerated application package when found.

5. A method of a first electronic device, comprising:
generating a Central Processing Unit (CPU)-independent binary and build information including build option information associated with development of a CPU-independent package, the CPU-independent binary being associated with an application to be executed by at least one third electronic device;
generating an application package including the CPU-independent binary and the build information; and
transmitting the generated application package to a server,
wherein the CPU-independent application package is used to change, by the server, the CPU-independent binary to a CPU-dependent binary so that the changed binary is optimized for processing speeds of a CPU of a selected build target among the at least one third electronic device.

6. A method of a second electronic device, comprising:
receiving information on at least one third electronic device supportable by each platform version, and information on a converter for the each platform version to be applied to the at least one third electronic device, and information on a build option dependent on at least one CPU included in the at least one third electronic device;
transmitting a build environment information on the at least one third electronic device to a server,
wherein the build environment information comprises the received information, and
wherein the build environment information is used to change a CPU-independent binary to a CPU-dependent binary so that the changed binary is optimized for processing speeds of a CPU of a selected build target among the at least one third electronic device.

7. The method of claim 6, further comprising:
receiving at least one instruction for adding, deleting, and changing at least a portion of the build environment information transmitted to the server; and
transmitting the received instruction to the server.

8. An apparatus of a server, comprising:
a build environment configuration unit configured to:
receive, from a first electronic device, an application package including at least a Central Processing Unit (CPU)-independent binary and build information including build option information associated with development of a CPU-independent package, the application package being associated with an application to be executed by at least one third electronic device;
receive, from a second electronic device different from the first electronic device, build environment information about the at least one third electronic device, wherein the build environment information comprises information on the at least one third electronic device supportable by each platform version, information on a converter for the each platform version to be applied to the at least one third electronic device, and information on a CPU-dependent build option;
by combining the build information with the build environment information, select, among the at least one third electronic device, a build target for which the CPU-independent binary is changed;
select a converter corresponding to the build target; and
configure a build option corresponding to the build target using the build option information included in the build information and the CPU-dependent build option included in the build environment information and a build option information associated with the selected converter; and
a converting unit configured to change the CPU-independent binary, using the configured build option corresponding to the selected build target, so that the changed binary is optimized for processing speed of a CPU of the build target,
wherein the second electronic device comprises an electronic device corresponding to a maker that manufactures the at least one third electronic device.

9. The apparatus of claim 8, wherein the application package is also generated with an intermediate representation by the first electronic device using build information of the at least one third electronic device.

10. The apparatus of claim 8, further comprising:
a package generation unit configured to regenerate an application package by including the changed binary,
wherein the build environment configuration unit is further configured to simulate the regenerated application package in the server and feed back a simulation result to the first electronic device.

11. The apparatus of claim 8, further comprising:
a package distribution unit configured to receive a request for an application package from a fourth electronic device among the at least one third electronic device, search for a regenerated application package including a binary that is optimized for a processing speed of a CPU of the fourth electronic device, and transmit, to the fourth electronic device, the regenerated application package when found.

12. A first electronic device, comprising:
a build unit configured to generate a Central Processing Unit (CPU)-independent binary and build information including build option information associated with development of a CPU-independent package, the CPU-independent binary being associated with an application to be executed by at least one third electronic device;
a package generation unit configured to generate an application package including the CPU-independent binary and the build information; and
a package registration unit configured to transmit the generated application package to a server,
wherein the CPU-independent application package is used to change, by the server, the CPU-independent binary to a CPU-dependent binary so that the changed binary is optimized for a processing speed of a CPU of a selected build target among the at least one third electronic device.

13. A second electronic device comprising;
a converting unit configured to receive information on at least one third electronic device supportable by each platform version, and information on a converter for the each platform version to be applied to the at least one third electronic device, and information on a build option dependent on at least one CPU included in the at least one third electronic device; and
a communication unit configured to transmit a build environment information on the at least one third electronic device to a server,
wherein the build environment information comprises the received information, and
wherein the build environment information is used to change a CPU-independent binary to a CPU-dependent binary so that the changed binary is optimized for processing speeds of a CPU of a selected build target among the at least one third electronic device.

14. The electronic device of claim 13, wherein the converting unit is further configured to receive at least one instruction for adding, deleting, and changing at least a portion of the build environment information transmitted to the server, and wherein the communication unit is further configured to transmit the received instruction to the server.

* * * * *